United States Patent Office 3,458,545
Patented July 29, 1969

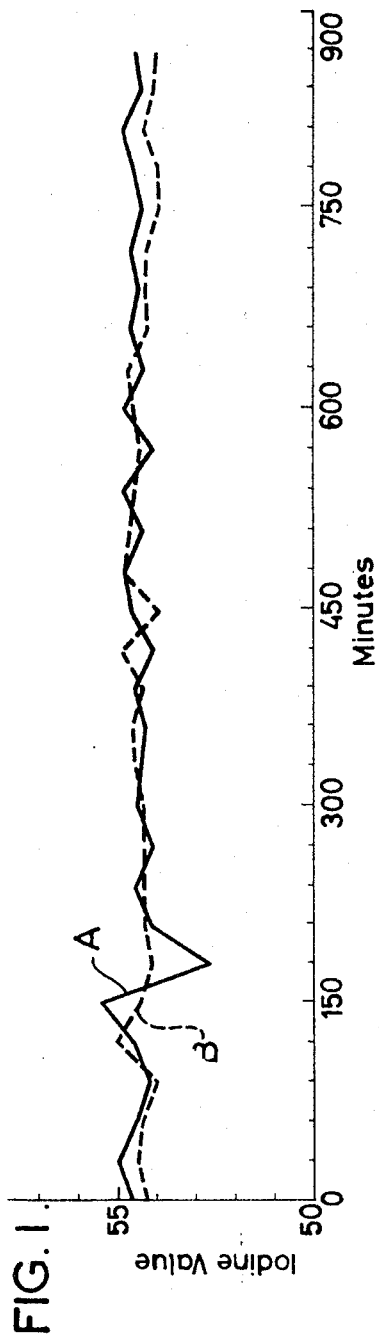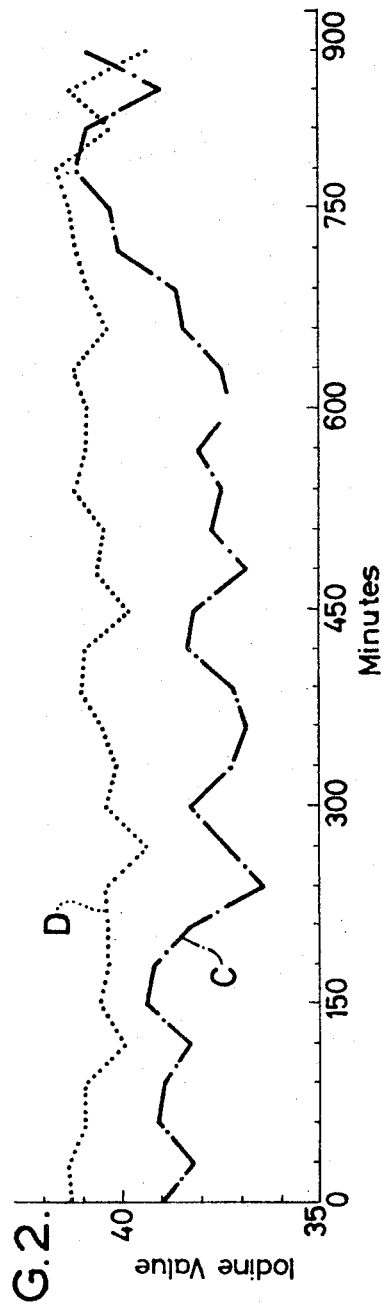

3,458,545
TREATMENT OF FATS
Louis Faur, Saint-Germain-en-Laye, France, and Pieter Westdorp, Didam, Netherlands, assignors to Lever Brothers Company, New York, N.Y., a corporation of Maine
Filed Oct. 4, 1966, Ser. No. 584,121
Claims priority, application France, Oct. 5, 1965, 33,816
Int. Cl. C11b 7/00
U.S. Cl. 260—419                                  9 Claims

ABSTRACT OF THE DISCLOSURE

Components of fat blends of different melting points are separated by incorporation of a dispersion of water and a wetting agent in the fatty material at a temperature at which a high-melting fraction is crystallized while maintaining the liquid fat as a continuous phase and subsequently separating from the system a liquid phase composed substantially of the liquid components of the fat blend.

---

The invention relates to the fractionation of fatty substances, like oils, fats and fatty acids, in which the mixture, preferably after being liquefied, is subjected to a cooling treatment to effect crystallization of the higher melting components present, followed by a separation of the solid fraction from the liquid fraction by decantation, filtration or centrifugation.

It has been proposed to carry out such a fractionation by dispersing the fatty mixture in a considerable amount of water which is generally 0.5 to 5 times the amount of fatty material present, in which in the aqueous medium a small amount of a wetting agent is present.

The crystals are wetted by the aqueous liquid and as a result thereof are taken up in the aqueous liquid forming an unstable oil-in-water emulsion and are separated from the liquid fatty substance present. Thereafter separation of the phases is carried out by settling or centrifugation.

Such a process has the drawback that it requires the presence of substantial amounts of water during processing, in particular during the stage in which the liquid and solid components dispersed in the aqueous phase are separated, and also the liquid material to be separated is initially emulsified in the aqueous phase.

It has now been found that it is possible to effect separation of solid and liquid fatty materials from a mixture thereof, while using a solution of a wetting agent, which avoids the use of unduly large quantities of water, and at the same time avoids the unnecessary emulsification of the liquid fatty material into the aqueous phase, the liquid fatty material forming the continuous phase during the whole process.

Accordingly the present invention provides a novel process for the fractionation of fatty substances, such as oils, fats and fatty acids, by effecting crystallization of the higher melting components present, followed by separation of the liquid and solid components, which process is carried out in such a way that before the separating treatment an amount of aqueous liquid (together with a small amount of a wetting agent) is added, which is at least sufficient to wet the solid crystals, the upper limit being chosen so that an unstable water-in-oil emulsion is formed.

The optimum amounts of aqueous liquid used in the process may thus vary appreciably and are chiefly dependent on the type of separating treatment chosen.

In case it is desired to effect the separation of liquid and solid components by filtration, a very low amount of aqueous liquid may be chosen, for instance between 0.1 and 2%, or between 0.5 and 1.5%. In using even these small amounts of water and wetting agent an appreciably improved filtration efficiency is observed. Somewhat higher amounts of aqueous liquid may be chosen, but then the danger increases that the filter is blocked by free water. In trials with such higher amounts the larger liquid fraction thus removed retained substantially the same composition and the same iodine value, whereas the purity of the smaller solid fraction obtained appeared to have been increased by the better separation, which is shown by a decrease in its iodine value.

The wetting agent is present in very small amounts only, just enough to lower the surface tension between fat and water sufficiently to make wetting of the crystals by water possible. Generally the amount of wetting agent does not exceed 0.2%, calculated on the oil. The wetting agent can be incorporated directly in the fatty substance which already contains the necessary amount of aqueous liquid or it can be added together with the water as an aqueous solution in the desired amounts. The wetting agent is conveniently added in the form of a 20% aqueous solution when low amounts of water are used. The wetting agent may also be formed in situ in the fatty substance to be treated. This occurs for instance if oils or fats are treated which contain free fatty acids. On adding an alkaline compound to the oil or fat, for instance by making the aqueous solution to be added slightly alkaline, soap is formed in the mixture, which acts as the wetting agent.

If the aqueous solution is used in relatively small proportions as described above, it can be introduced into the fatty mixture in the form of water vapour, which has the advantage that the water droplets are easily distributed throughout the fatty mixture. The most appropriate moment for the addition of water or water vapour is after the crystallization treatment has been completed, that is when an equilibrium is reached between liquid and solid phase at the crystallization temperature chosen. This is of course a period of time which may vary, depending primarily on the properties of the mixture treated. For instance, a mixture of fatty acids requires a cooling period of a few minutes to reach an equilibrium whereas a product like natural tallow requires a period of up to 6 hours, other fatty mixtures taking even longer times.

It is desirable to stir the fatty mixtures for a short time after the addition of the aqueous phase in order to obtain a good distribution of the ingredients, so that the aqueous phase can adequately exert its wetting action.

It is however, also possible to effect crystallization in the presence of the aqueous phase, which may be either pure water or an aqueous solution of the wetting agent, and also in that case the separation of the liquid and solid components can only be effected after a certain period of time sufficiently long to reach an equilibrium.

Preferably, a higher amount of aqueous phase is chosen, for instance in the range of 20 to 40%, if the separating treatment is carried out by decantation or centrifugation or a combination of these. As a rule the amount of aqueous phase is about 2–4 times the amount of the crystalline fraction, formed under the conditions of the process.

In particular if separation is effected in this way, the aqueous solution containing the wetting agent is added to the fatty mixture in such an amount that initially an unstable water-in-oil emulsion is formed, advantage being taken of the fact that water-in-oil emulsions are completely broken by wetting agents.

The separation of oil and fatty crystals is brought about in that fat crystals concentrate in and pass through the oil-in-water interface, preferably with continuous stirring, after which the water droplets, which are predominantly filled with crystallized fat, rapidly coalesce and settle down within the oil phase and separate as a distinct layer of water containing dispersed crystals. It is an advantage that the fat crystals are freed from the oil without the oil being substantially emulsified, so that, if desired, already a substantial proportion of the liquid fatty material can be drawn off without using a centrifuge. The final separation of the system into two phases can be effected by settling or by centrifugal action, and also by a combination of them, when after simple decantation of a substantial portion of the liquid material the remainder of the fatty mixture is centrifuged.

In one modification of the process of the invention the difference in density between oil and water phase is increased, for instance by adding a sufficient quantity of water-soluble salts to the water phase. In combining the use of an unstable water-in-oil emulsion with a water phase which is made dense by the addition of salts, in many cases a very rapid and good separation is possible by settling only.

Mixtures of fatty materials to be treated by the method of the invention are mixtures of fatty acids especially those having 10 to 24 carbon atoms (those having 12 to 18 carbon atoms being of particular interest), and mixtures of esters of such acids, especially glycerol triesters. The carboxylic acid ester mixtures and fatty acid mixtures treated may be of natural or synthetic origin. Examples of the various types of vegetable fats include coconut oil, palm oil and rapeseed oil. Examples of animal fats include beef fat, hog fat, as well as whale oil. Also fatty acid mixtures of natural origin may be treated which are obtained from the naturally occurring carboxylic acid ester mixtures mentioned above.

In making the water-in-oil emulsion one suitably proceeds from a completely molten fatty material, which is gradually cooled down to the desired temperature with stirring. When a fraction has crystallized out, the aqueous phase is stirred into the fat slurry formed. For the first few minutes the mass is stirred vigorously to further the take-up of the fatty crystals in the water drops, and then gently, to promote coalescence of the water phase. The mixture is treated for further separation in a centrifuge or it is allowed to settle after a coarse coagulate has formed, consisting of irregularly formed drops of water phase, in which the crystals with a small amount of emulsified oil are dispersed. The crystallized fat fraction deposits together with the water phase; the oil phase is decanted. The crystals collect at the top of the water phase layer and form a paste, which is further worked up by melting, washing with water and drying. The wetting agent used in the water-phase should be such that the ratio between its wetting and emulsifying power is considerably in favour of the former. This ratio may be influenced by the addition of electrolytes, but preferably those wetting agents are used which possess a satisfactory wetting capacity with little tendency to form oil-in-water emulsions of liquid fat even when no extra electrolytes are present. Examples of such wetting agents are alkali metal soaps of carboxylic acids with or without intermediate linkages, sulphuric esters, alkane sulphonates, alkyl-aryl sulphonates and higher alkyl esters of sulpho succinic acid, all these derivatives of sulphuric and sulphonic acids being preferably used in the form of their sodium salts.

When the unstable water-in-oil emulsion is formed, the crystals migrate from the oil to the water drops formed, before the drops coalesce rapidly into larger drops, which are capable of settling, so that the liquid oil stays behind as a clear, crystal-free layer. Settling alone often leads to technically very suitable fractionations, for instance when treating mixtures of fatty acids, or when a stearin fraction of about 15–20% has to be removed from an oil, so that the use of a centrifuge can be dispensed with in these cases.

The presence of a water-in-oil emulsion may be detected by measuring the specific electrical conductivity of the emulsion, which is appreciably lower than that of an oil-in-water emulsion (a factor of about 100).

Such a determination, however, is mostly superfluous, because the presence of the right type of emulsion can be observed firstly by its colour (an oil-in-water emulsion is lighter in colour than the other type) and secondly by the curdling effect noticeable after a short time, i.e. the more or less spontaneous occurrence of a coagulate of rapidly coalescing water drops containing the crystals, combined with quick settling.

With several types of fatty mixtures, such as e.g. groundnut oil fatty acids, the settling may be effected more satisfactorily when salts, such as $MgSO_4$ or $Na_2SO_4$, are added to the water phase in amounts ranging between 0.5 and 30%, preferably between 10 and 20%.

As already described, the selection of the best conditions during the fractionating treatment when carrying out the process of the invention is chiefly dependent on the type of mixture to be treated as well as on the temperature of treatment which determines the amount of solid phase to be separated. Also the size of the crystals formed is of importance, since bigger crystals can be more easily separated from the liquid phase than smaller ones. The formation of large crystals can be promoted by effecting a slow, preferably gradual cooling, to give the crystals formed an opportunity to grow. The separating treatment may be repeated, using different crystallization temperatures, for instance to obtain a middle fraction of a fatty material.

The following examples illustrate the invention.

Example 1

A jacketed mixer with a capacity of about 26 tons was charged with neutral bleached palm oil, having an iodine value of 51 at a temperature of 80° C.

Cooling was carried out for 24 hours by circulating cold water through the jacket and stirring at a speed of 5 r.p.m. until a temperature of 32° C. was reached.

Filtration of the crystals so formed was effected at 32° C., after the addition of 120 l. of a 20% aqueous solution of sodium lauryl alcohol sulphate in the form of fine droplets sprayed through a perforated tube with perforations of 2 mm. diameter, placed over the mixer, stirring being continued during this addition.

During filtration, every 30 minutes a sample was taken of the solid fraction as well as of the liquid fraction, for determining their respective iodine values. In the accompanying drawing graph A in FIGURE 1 shows the variation of iodine value with time of the liquid fractions during crystallisation and B is the corresponding curve obtained when fractionation was carried out under identical conditions but without the aqueous wetting agent. These graphs show that the iodine values of these fractions remained substantially constant in both cases and that the average value was practically the same, although the amount of olein was about 7% higher when carrying out the process according to the invention, i.e. in the presence of an aqueous wetting agent.

In FIGURE 2 graph C shows the variation in iodine value with time of filtration for the solid fractions obtained by the process and graph D is the corresponding curve obtained when the fractionation was carried out in the absence of the wetting agent. On comparing the curves C and D, it will be found that, during the greater part of the filtration process, when a wetting agent is used the iodine value remains three units lower, on an average, than the value obtained in the absence of a wetting agent.

Also the melting point of the solid fraction obtained with addition of the aqueous wetting agent increases, viz, by about 1 to 1.5° C. (50.8° C. instead of 49.6° C.).

Apart from the fall in average iodine value, which has passed from 40 to 38, and the increase in melting point, the variation of other characteristic factors, corresponding with the dilatation shown by the most saturated fraction on passing from the solid into the liquid state, confirms the occurrence of a better separation of this fraction in the presence of a small amount of a wetting agent. The dilatation at 20° C. was 990 for the solid fraction obtained without the addition of aqueous wetting agent and 1190 for the stearine with addition of such an agent.

Example 2

A batch of about 25 tons of neutral palm oil was filled into a mixer, after the injection of water vapour in order to bring its humidity to a value of 0.5%, the temperature being 80° C.

Crystallisation was effected by slow cooling to 34° C. and was followed by the addition to said batch of 10 kg. of a commercial aqueous solution of sodium secondary octadecyl sulphate sold under the trade name of "Teepol," which addition corresponds with a concentration of the order of 8% in the moistening water, i.e. with a concentration of the order of 0.04% by weight of the oil treated. The crystallisation was then continued down to a temperature of 32° C. and the crystals deposited were then filtered off.

When a crystallisation was effected with a batch of normal, neutral palm oil of the same origin but not humidified, and without adding a wetting agent, it was found that the iodine value of the solid fraction obtained by starting from said palm oil had decreased by about one unit.

Example 3

Palm kernel oil having an iodine value of 16 was cooled from 60° C. to 23° C. and seeded with a solid fraction resulting from the fractionation of a palm kernel oil and at the end of the crystallisation 0.1% of sodium lauryl alcohol sulphate was added.

About 25% was obtained of a solid fraction having an iodine value between 11 and 12 (effecting the same operation without the addition of the wetting agent yielded a solid fraction with an iodine value of the order of 14).

Apart from the better separation of the solid fraction which is achieved, in the dry fractionation process, by the addition of the wetting agent at the end of the crystallisation operation, it has also been found that the speed of filtration is raised by the addition of the wetting agent.

Example 4

De-slimmed Sumatra palm oil with an iodine value of 51.6 and an acid value of 8.6 was heated to 80° C. and gradually cooled down to a temperature of 25° C. with stirring.

When a fraction had crystallised out, the water phase, consisting of a solution of 0.5% sodium lauryl sulphate to which 10% $MgSO_4$ had been added, was stirred in the fat slurry formed in an amount of 33.3% by weight. For the first few minutes the mass was stirred vigorously and then gently, to promote coalescence of the water phase. After the coagulate had formed, consisting of irregularly formed drops of water phase, in which the crystals with a small amount of emulsified oil were dispersed, the mass was treated for five minutes in a centrifuge at 4000 r.p.m. The crystallised fat fraction deposited together with the water phase; the oil phase was decanted. The crystals, collected at the top of the water phase layer, had formed a paste which was further worked up by melting, washing with water and drying. The time of crystallisation was two days and the final temperature obtained with constant stirring at 60 r.p.m. was 18° C. A solid fraction was obtained, the yield amounting to 24% of the fat, with a melting point of 53.5° C. and an iodine value of 32.1. The liquid fraction had a melting point of 20° C. and an iodine value of 56.7.

Example 5

Example 4 was repeated except that the mixture was gradually cooled down to a temperature of 28° C. A solid fraction was obtained in a yield of 17.5% of the fat, with a melting point of 55.3° C. and an iodine value of 30.0.

Example 6

Fatty acids were treated in a stirred vessel, provided with a cooling coil. The fatty acids were composed of 75% bone grease fatty acids with an iodine value of 57 and 25% commercial oleic acid with an iodine value of 90, the iodine value of the mixture being 65.

The fatty material was cooled with stirring and allowed to equilibrate until a temperature of 18° C. was reached. After equilibration 10% of a 20% aqueous solution of sodium n-dodecyl sulphate was added and the mixture, still at a temperature of 18° C., was stirred for 45 minutes. The product was then filtered under vacuum and the solid and liquid fractions were isolated. The solid fraction had an iodine value of 21.8 and the liquid fraction of 83.6.

Example 7

To Australian beef tallow 35% by weight of a water phase was added, consisting of 0.1% technical sodium lauryl sulphate, 20% $MgSO_4$, 0.5% $Na_2SO_4$ and 0.5% CMC. The crystallisation time was about 4 hours at a temperature of 40° C. The density of the water phase was sufficiently high to enable settling. After settling 34.5% of a solid phase was obtained with an iodine number of 38.3 and a melting point of 49.4° C. The liquid phase had an iodine unmber of 47.6 and a melting point of 39.9° C.

Example 8

To the same Australian beef tallow 33.3% by weight of a solution consisting of 0.1% technical sodium lauryl sulphate, 5% $MgSO_4$ and 0.5% $Na_2SO_4$ was added and the mixture was stirred for ten minutes, being rapidly stirred for one minute, followed by slow stirring. Subsequently the mixture was kept at 40° C. for about one hour. Finally it was centrifuged for five minutes at a maximum speed of about 5000 r.p.m. The solid phase, obtained in a yield of 33%, had an iodine value of 354 and a melting point of 50.1° C. The liquid phase had an iodine value of 48.5 and a melting point of 35.8° C.

Example 9

The process was carried out as in Example 7 but using as the aqueous wetting agent a 0.5% aqueous solution of the commercial wetting agent "Aerosol-OT" (sulpho-succinic acid 2-ethyl-hexyl ester).

What is claimed is:

1. A process for fractionating a mixture of fatty materials of different melting points which comprises incorporating 0.1% to 40% of water and from 0.01% to 0.2% of a wetting agent, both percentages being by weight of the starting mixture, into the mixture of fatty materials to form an unstable water-in-oil emulsion, maintaining the mixture as a water-in-oil emulsion having a continuous liquid fatty phase and having a temperature at which the mixture contains both solid and liquid fatty constituents, and thereafter separating the mixture of fatty materials into its liquid and solid components.

2. Process according to claim 1, in which the amount of water added is just sufficient to wet the solid crystals present in the mixture, but not more than 10% by weight of the mixture, and the separation of the liquid and solid constituents is effected by filtration.

3. Process according to claim 2, in which the amount of water is not more than 1%.

4. Process according to claim 2, in which addition of the water is effected by injection of water vapor.

5. Process according to claim 1, in which the amount of water used is higher than 10% but lower than 40% by weight of the mixture to form an unstable emulsion of the water-in-oil type at a temperature at which the mixture contains both solid and liquid constituents, the solid fatty materials being dispersed in the aqueous phase, whereafter separation is effected by settling, centrifugation or a combination of these.

6. Process according to claim 5, in which the amount of water added is about 2 to 4 times the solid fatty fraction to be removed at the temperature of separation.

7. Process according to claim 5 in which the water is introduced into the fatty mixture with vigorous stirring to promote the formation of an emulsion of the water-in-oil type after which by gentle stirring this emulsion is broken by coalescence of the water drops containing the solid crystals.

8. Process according to claim 1, in which the difference in density between the fatty liquid and the water is increased by adding 0.5% to 30% by weight of a salt selected from the group consisting of magnesium sulphate and sodium sulphate.

9. Process according to claim 1, in which the mixtures treated are selected from the group consisting of palm oil, palm kernel oil and tallow.

References Cited

UNITED STATES PATENTS

| | | | |
|---|---|---|---|
| 918,612 | 4/1909 | Twitchell | 260—419 |
| 2,296,457 | 9/1942 | Schutte | 252—303 |
| 2,800,493 | 7/1957 | Stein et al. | 260—419 |
| 3,052,700 | 9/1962 | Waldmann et al. | 260—419 |

FOREIGN PATENTS

| | | |
|---|---|---|
| 165,094 | 3/1954 | Australia. |

OTHER REFERENCES

Sienko et al.: "Chemistry," 1961, p. 5, McGraw-Hill Book Co., New York.

ALEX MAZEL, Primary Examiner

R. V. RUSH, Assistant Examiner